Patented Mar. 30, 1943

2,314,997

UNITED STATES PATENT OFFICE 2,314,997

METHOD OF IMPROVING THE ADHESION OF RUBBER TO COTTON

Edward T. Lessig and Hal P. Headley, Akron, Ohio, assignors to The B. F. Goodrich Company, New York, N. Y., a corporation of New York No Drawing. Application February 11, 1939, Serial No. 256,010

6 Claims. (Cl. 154—2)

This invention relates to the adhesion of rubber to cotton in the form of cords, fabrics and the like.

The length of service of many articles of commerce embodying cotton and rubber such as tires and belts, for instance, is largely dependent upon the degree of adhesion between the rubber and cotton. The industrial importance of such articles has led to a continual search for methods of increasing said adhesion. It is an object of this invention, accordingly, to provide a method whereby a remarkable improvement in the adhesion between rubber and cotton may be obtained.

It is known that the adhesion between rayon and rubber may be improved by a treatment at room temperature with a heat-hardening polyhydric - phenol - aldehyde - latex dispersion, of which resorcinol-formaldehyde-latex dispersions are the most widely used. When this treatment is applied to cotton cords, however, no consistent improvement in the adhesion between the cords and the rubber is obtained. In some cases the adhesion is decreased, in other cases slight improvements are obtained, but in no case does this treatment consistently produce any marked increase in adhesion.

We have discovered that the adhesion between cotton and rubber may be greatly improved if the cotton is treated at an elevated temperature with a heat-hardening phenol-aldehyde-latex composition containing a small amount of a penetrant.

Penetrants are strongly polar compounds comprising a nonpolar hydrocarbon portion of high molecular weight, at some point in which is located a sufficiently polar or water-soluble group to endow the molecule with the property of at least colloidal solubility in water. Penetrants are often characterized as possessing "surface activity" because of the reduction in interfacial tension effected by the compounds and because of their property of peptizing the non-cellulosic portions of the cord. Although soap was formerly the best penetrant, the synthetic saponaceous penetrants, of which a considerable number are now known, have more desirable properties and are preferred in this invention. Sodium fatty alcohol sulfates which are ordinarily produced by the hydrogenation of fats and fatty acids and the sulfation of the product are as a class good penetrants. Other classes of materials useful as penetrants include the alkali metal salts of sulfated fatty acid esters, of sulfated fatty acid amides, of secondary alcohol sulfates, of sulfated esters of higher alcohols and dibasic acids, and of mono and dialkyl substituted aromatic sulfonates.

Although resorcinol-formaldehyde-latex compositions are preferably employed, other heat-hardening polyhydricphenol-aldehyde-latex dispersions may be used. The preferred phenolic compounds are the polyhydric-phenols having hydroxyl groups in a meta relationship such as resorcinol, phloroglucinol, orcinol, cresorcinol, m-xylorcinol, etc. Although the best results are not obtained by employing phenol alone, the phenolic part of the composition may, if desired, comprise a mixture of phenol and polyhydricphenols. While formaldehyde is the preferred aldehyde, other aldehydes such as acetaldehyde or furfural may be substituted for the formaldehyde either wholly or in part. Examples of suitable compositions are disclosed in U. S. Patent No. 2,128,229 issued to Charch and Maney.

It is desirable for the successful practice of this invention that the penetrant be added to the polyhydricphenol - aldehyde - latex composition, and not to the latex or other components before the phenol and aldehyde and latex are combined. While the latter procedure produces unstable dispersions, the penetrant may be added to the phenol-aldehyde-latex composition to produce dispersions which are stable indefinitely. The penetrant is included in the dispersion in a small amount such as ½% of the volume of dispersion, and ordinarily should not be included in proportions greater than 5% for the best results.

For the most successful practice of this invention, the cotton cord or fabric should be treated with the dispersion at an elevated temperature. The preferred range is from 70°–100° C., a temperature of 85° C. being often employed in commercial operations. As will hereafter be shown, some improvement in adhesion may be obtained by dipping at lower temperatures. The results at room temperature are erratic, however, and no consistent improvement has been obtained. The remarkable improvement obtainable by the practice of this invention is produced only at higher temperatures.

The cord need usually be immersed in the dispersion for a short time, such as a minute or more, or in any case for a time no longer than that necessary to wet the cord. The treated cord is then thoroughly dried in hot air to remove the moisture and harden the coating. Drying at 185° F. ordinarily hardens the coating sufficiently by the time the water is removed. The cord may be dried under tension, if desired, in the manners well known to those skilled in the art.

To illustrate the improvement in adhesion obtainable by the method of this invention, a resorcinol-formaldehyde-latex mixture was prepared by mixing 41.5 gal. of a mixture containing the following:

| | |
|---|---|
| Resorcinol _____lb.____ | 40.5 |
| Formalin (40% solution)_____lb.____ | 81 |
| Caustic soda_____lb.____ | .54 |
| Water _____gal.___ | 86.5 | and 58.5 gal. of a mixture containing the following:

| | |
|---|---|
| Latex (38% rubber solids)_____lb.____ | 359 |
| Caustic soda_____lb.____ | 2.5 |
| Water_____gal.___ | 55 |

To separate samples of dispersion were added 0.5% by volume of various penetrants. Cotton cord was dipped in the dispersion and thoroughly dried under tension at 185° F. The treated cords were tested for adhesion by vulcanizing rubber containing the cord, cutting from the rubber cylindrical samples containing the cord disposed diametrically therein, and compressing the cylinder in a Tinius-Olsen testing machine until separation between the cord and the rubber occurred.

| Penetrant used in resorcinol-latex-formaldehyde dispersion | Temperature of dispersion °C. | Percent increase in adhesion |
|---|---|---|
| Alphasol A | 70 | 100 |
| Dispersaide A | 70 | 89 |
| Aquarex D | 70 | 123 |
| Tergitol #4 | 70 | 113 |
| Tergitol #4 | 100 | 123 |
| Tergitol #7 | 27 | 30 |
| Tergitol #7 | 75 | 113 |
| Tergitol #7 | 100 | 205 |

Applicants have been informed that Aquarex D is the sodium salt of the sulfated alcohols containing from 12–18 carbon atoms, and that the Tergitols are the sodium salts of sulfated secondary alkyl alcohols. The other materials are commercially available penetrants of whose composition applicants are unaware. It can be seen that at temperatures of 70° C. and 100° C., remarkable increases in adhesion are obtained, but that only a small increase is obtained at room temperature even in the presence of a penetrant.

The increase in adhesion of cotton cord by a polyhydric-phenol-aldehyde-latex treatment at elevated temperatures in the presence of a penetrant appears to be specific for cotton, for the inclusion of a penetrant in a resorcinol-formaldehyde-latex solution in the treatment of rayon is detrimental to the adhesion.

Although applicants have herein disclosed specific embodiments of their invention, it is not our intention to limit the invention thereto, for it will be obvious to those skilled in the art that many modifications are within the spirit and scope of the invention as defined in the appended claims.

We claim:

1. In a treatment of cotton with an aqueous heat-hardening polyhydric-phenol-aldehyde-latex dispersion, the step which comprises wetting the cotton with said dispersion in a heated condition and containing a small amount of a penetrant.

2. In a treatment of cotton with an aqueous heat-hardening resorcinol-formaldehyde-latex dispersion, the step which comprises wetting the cotton with said dispersion at a temperature of at least 70° C. and containing a small amount of a penetrant.

3. In a treatment of cotton tire cord with an aqueous heat-hardening resorcinol-formaldehyde-latex dispersion, the step which comprises wetting the cotton with said dispersion at a temperature of at least 70° C. and containing not over 5% by volume of a penetrant.

4. In a treatment of cotton with an aqueous heat-hardening resorcinol-formaldehyde-latex dispersion, the step which comprises wetting the cotton with said dispersion at a temperature of at least 70° C. and containing a small amount of a synthetic saponaceous penetrant.

5. A process of improving the adhesion of cotton to rubber which comprises coating the cotton with an aqueous polyhydricphenol-aldehyde-latex dispersion at a temperature of at least 70° C. and containing a small amount of a penetrant, drying the coated cotton, associating the treated cotton with a vulcanizable rubber composition, and vulcanizing the composite product.

6. A product containing vulcanized rubber strongly adhered to cotton by the method of claim 5.

EDWARD T. LESSIG.
HAL P. HEADLEY.